(12) United States Patent
Oh

(10) Patent No.: US 6,811,584 B2
(45) Date of Patent: Nov. 2, 2004

(54) CYCLONE DUST COLLECTING APPARATUS FOR A VACUUM CLEANER

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 386 days.

(21) Appl. No.: 10/154,721

(22) Filed: May 24, 2002

(65) Prior Publication Data

US 2003/0159237 A1 Aug. 28, 2003

(30) Foreign Application Priority Data

Feb. 28, 2002 (KR) .................................. 10-2002-10924

(51) Int. Cl.$^7$ .............................. B01D 45/12; A47L 9/20
(52) U.S. Cl. .............................. 55/296; 55/301; 55/337; 55/DIG. 3; 15/352
(58) Field of Search .......................... 55/282, 295, 296, 55/297, 301, 304, 305, DIG. 3, 459.1, 337; 210/413; 15/352, 353

(56) References Cited

U.S. PATENT DOCUMENTS

| | | | | |
|---|---|---|---|---|
| 786,549 A | * | 4/1905 | Dion | 210/413 |
| 2,171,248 A | * | 8/1939 | Van Berkel | 55/392 |
| 2,232,574 A | | 2/1941 | Veevers | |
| 3,797,064 A | * | 3/1974 | MacFarland | 15/351 |
| 3,979,194 A | * | 9/1976 | Wiser | 55/296 |
| 5,271,751 A | * | 12/1993 | Lagler | 55/295 |
| 6,195,835 B1 | | 3/2001 | Song et al. | |
| 2002/0178699 A1 | * | 12/2002 | Oh | 55/337 |
| 2003/0066273 A1 | * | 4/2003 | Choi et al. | 55/337 |

FOREIGN PATENT DOCUMENTS

| | | |
|---|---|---|
| EP | 11 36028 A2 | 9/2001 |
| GB | 807329 | 7/1957 |
| JP | 04084919 A * | 3/1992 |
| WO | WO0105291 | 4/2002 |

OTHER PUBLICATIONS

German Examination Report—Issue date: Dec. 2, 2002.

* cited by examiner

Primary Examiner—Frank M. Lawrence
(74) Attorney, Agent, or Firm—Ladas & Parry LLP

(57) ABSTRACT

A cyclone dust collecting apparatus having a cyclone body that has a first connection pipe connected to an extension pipe adjacent to a suction port of the vacuum cleaner, and a second connection pipe connected to the extension pipe adjacent to a body of the vacuum cleaner, and an air inflow port interconnected with the first connection pipe. An air outflow port is interconnected with the second connection pipe. The cyclone body is adapted to form an air flow vortex of contaminant-laden air that is drawn in through the air inflow port. A dust receptacle is removably connected to the cyclone body for receiving contaminants separated from the air by the vortex. A grill assembly is disposed at the air outflow port of the cyclone body, and has a plurality of longitudinal slots formed in an outer circumference of the grill body at a constant interval from each other.

4 Claims, 3 Drawing Sheets

CYCLONE DUST COLLECTING APPARATUS FOR A VACUUM CLEANER

CLAIM OF PRIORITY

This application hereby refers to, and incorporates herein by reference, an earlier filed patent application entitled CYCLONE DUST COLLECTING APPARATUS FOR A VACUUM CLEANER, filed in the Korean Industrial Property Office on Feb. 28, 2002, and there duly assigned Serial Number 2002-10924. Applicant hereby claims all benefits accruing under 35 U.S.C. Section 119 for and from said earlier filed Korean patent application.

BACKGROUND OF THE INVENTION

1. Field of the Invention

The present invention relates to a cyclone dust collecting apparatus for a vacuum cleaner, and more particularly to a cyclone dust collecting apparatus for a vacuum cleaner having a contaminant removing means for removing contaminants from a grill assembly easily.

2. Description of the Prior Art

Generally, a cyclone dust collecting apparatus for a vacuum cleaner separates and collects contaminants from contaminant-laden air that is drawn into the cleaner through a suction port. The cyclone dust collector operates by generating a helical flow or vortex of air, it uses a centrifugal force from such generated vortex of air to separate the particulate contaminants.

U.S. Pat. No. 6,195,835 (application Ser. No. 09/388,532) issued Mar. 6, 2001 to the same applicant discloses a vacuum cleaner having a cyclone dust collecting apparatus.

FIG. 1 schematically shows the structure of the vacuum cleaner having the cyclone dust collecting apparatus disclosed and claimed in U.S. Pat. No. 6,195,835. As shown in FIG. 1, the cyclone dust collecting apparatus includes a cyclone body 20, a dust receptacle 30 and a grill assembly 40.

The cyclone body 20 includes a first connection pipe 21 connected to a suction port extension pipe 1a, a second connection pipe 22 connected to the cleaner body extension pipe 1b, an air inflow port 23 interconnected with the first connection pipe 21, and an air outflow port 24 interconnected with the second connection pipe 22. In the cyclone body 20, the contaminant-laden air is drawn in through the air inflow port 23, forming a whirling helical vortex current.

The dust receptacle 30 is removably connected to the cyclone body 20, and receives the contaminants separated from the air by the centrifugal force of the whirling air current of the cyclone body 20.

The grill assembly 40 is disposed at the air outflow port 24 of the cyclone body 20, to prevent a reversal flow of the collected contaminants through the air outflow port 24. The grill assembly 40 includes a grill body 41, a plurality of fine holes 42 formed in an outer circumference of the grill body 41 to form a passage to the air outflow port 24, and a contaminant reversal preventing plate 43 of frusto-conical shape formed at the lower end of the grill body 41.

Generally speaking, the vacuum cleaner having the cyclone dust collecting apparatus constructed as described above, the contaminant-laden air is drawn in by a suction force that is generated at the suction port of the vacuum cleaner, into the cyclone body 20 in a diagonal direction through the first connection pipe 21 and the air inflow port 23. The drawn air flows downward through the cyclone body 20, forming a vortex air current (indicated in solid-lined arrow of FIG. 1). In this process, contaminants are separated from the air by the centrifugal force of the vortex air, and are retained in the dust receptacle 30.

As the air current strikes the bottom of the dust receptacle 30, the air flows in a reversed direction, i.e., it flows upward through the cyclone body 20. The air then flows through the fine holes 42 of the grill assembly 40, the air outflow port 24 and the second connection pipe 22, and is then discharged into the cleaner body. Some contaminants borne by the upwardly moving air current strike the contaminant reversal preventing plate 43 and are thus reflected into the vortex air current. Other contaminants, which are still entrained in the upwardly moving air current after the air flow encounters the contaminant reversal preventing plate 43, are filtered out at the fine holes 42 of the grill assembly 40 as the air flows through the fine holes 42. These filtered contaminants may fall back into the vortex air current.

Contaminants which are not removed even by the fine holes 42, are discharged through the fine holes 42 and the air outflow port 24, but are filtered out at a paper filter of the cleaner body, and the clean air is discharged outside the vacuum cleaner via the motor chamber (not shown).

In the vacuum cleaner cyclone dust collecting apparatus described above, some contaminants adhere to the grill assembly 40 when the contaminant-laden air passes through the fine holes 42 of the grill assembly 40. As time goes by, the contaminants increasingly attach to the grill assembly 40, and finally clog the fine holes 42. As a result, problems like suction force deterioration and motor overload occur. Accordingly, the contaminants have to be removed from the fine holes 42 of the grill assembly 40 regularly. With the general cyclone dust collecting apparatus described above, in order to remove the contaminants from the grill assembly 40, a user has to separate the dust receptacle 30 from the cyclone body 20 and remove the contaminants manually or by using a brush. Accordingly, the grill assembly cleaning process becomes tricky. Also, since the grill assembly 40 is exposed during its cleaning, there is a high possibility that the contaminants will be inadvertently knocked off into the air, contaminating the surrounding area.

SUMMARY OF THE INVENTION

The present invention overcomes the above problems of the prior art. Accordingly, it is an object of the present invention to provide a cyclone dust collecting apparatus for a vacuum cleaner in which contaminants can be removed from a grill assembly easily even though a dust receptacle is in a mounted position, and the contaminants removed from the grill assembly are collected in the dust receptacle so as to keep the surrounding area clean.

The above object is accomplished by a cyclone dust collecting apparatus for a vacuum cleaner made according to the present invention. The collecting apparatus includes a cyclone body that has a first connection pipe connected to an extension pipe adjacent to a suction port of the vacuum cleaner, a second connection pipe connected to the extension pipe adjacent to a body of the vacuum cleaner, an air inflow port interconnected with the first connection pipe, and an air outflow port interconnected with the second connection pipe. The cyclone body is adapted to form a vortex of contaminant-laden air that is drawn in through the air inflow port. A dust receptacle removably connected to the cyclone body for receiving contaminants separated from the air by the vortex. A grill assembly is disposed at the air outflow port of the cyclone body, and a plurality of longitudinal slots are formed in an outer circumference of the grill body at a constant interval from each other to form a passage to the air outflow port. The grill assembly prevents the contaminants collected in the dust receptacle from reversely traveling through the air outflow port of the cyclone body. A contaminant removing member can be moved up and down over the outer circumference surface of the grill body to remove contaminants that are attached to and around the respective longitudinal slots of the grill assembly. An operating lever has one end connected to a center of the contaminant removing member and the other end protrudes from an outside of the cyclone body through the inside of the grill body so as to move the contaminant removing member upward and downward.

According to the preferred embodiment of the present invention, the plurality of longitudinal slots have at least two opposing slots serving the function of a guide for the contaminant removing member when the contaminant removing member is moved upward and downward. The contaminant removing member comprises a cylindrical body with a rib that is inserted into the at least two opposing slots, and a brush is attached to an inner circumference of the cylindrical body.

The grill assembly includes a conical contaminant reversal preventing plate, which is integrally formed with a lower end of the grill body.

The other end of the operation lever is provided with a handle formed thereon.

BRIEF DESCRIPTION OF THE DRAWINGS

The above-mentioned objects and the features of the present invention will be more apparent by describing the preferred embodiment of the present invention by referring to the appended drawings, in which.

DETAILED DESCRIPTION OF THE PREFERRED EMBODIMENT

The preferred embodiment of the present invention will be described below in greater detail by referring to the appended drawings.

Figure 1:
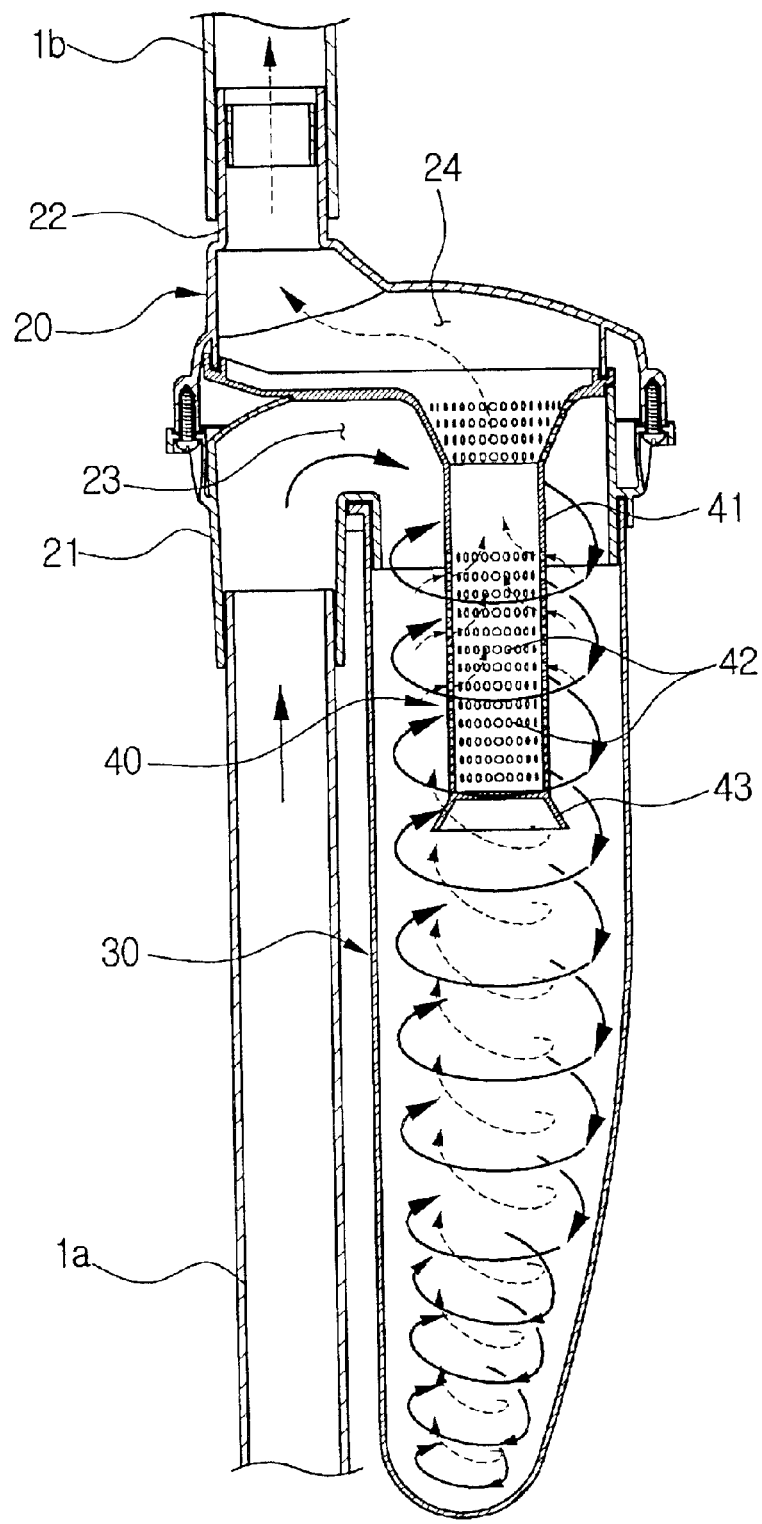
FIG. 1 is a sectional view of a conventional prior art cyclone dust collecting apparatus for a vacuum cleaner.
Figure 2:
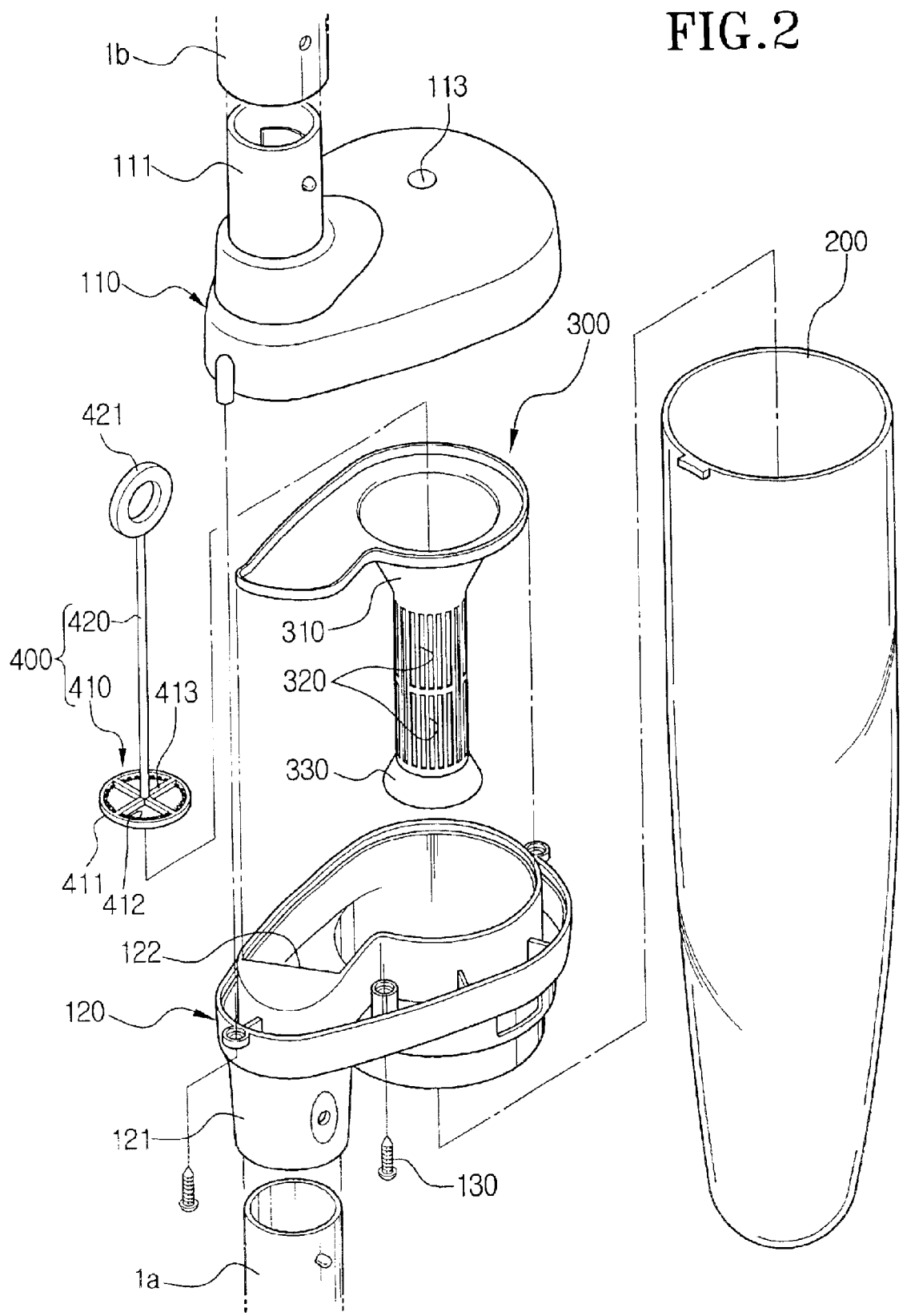
FIG. 2 is an exploded perspective view of a cyclone dust collecting apparatus for a vacuum cleaner according to the preferred embodiment of the present invention.
Figure 3:
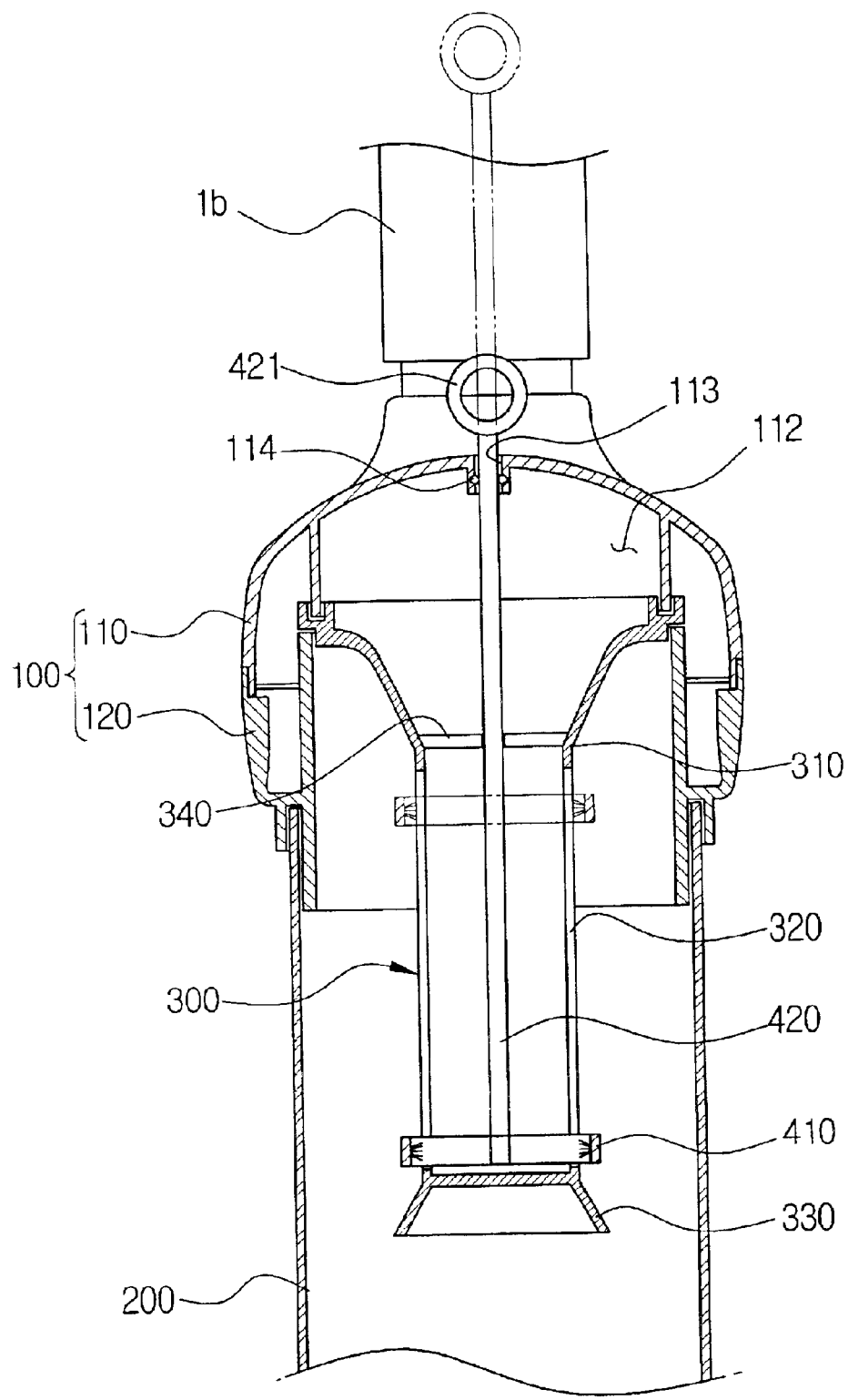
FIG. 3 is a sectional view showing the contaminant removing unit of the cyclone dust collecting apparatus for a vacuum cleaner of FIG. 2 as it appears when it has been assembled.

As shown in FIGS. 2 and 3, the cyclone dust collecting apparatus for a vacuum cleaner according to the preferred embodiment of the present invention includes a cyclone body 100, a dust receptacle 200, a grill assembly 300 and a contaminant removing unit 400.

The cyclone body 100 is divided into an upper body 110 and a lower body 120, which are connected to each other by a plurality of screws 130. The lower body 120 has a first connection pipe 121 connected to an extension pipe 1a at the suction port of the cleaner, and an air inflow port 122 interconnected with the first connection pipe 121. The upper body 110 has a second connection pipe 111 connected to the extension pipe 1b at the body of the cleaner, and an air outflow port 112 interconnected with the second connection pipe 111. The upper body 110 also has a through hole 113 formed at a top side. The contaminant-laden air, drawn in through the suction port of the cleaner, is drawn into the cyclone body 100 through the first connection pipe 121 and the air inflow port 122 in a helically downward or diagonal direction. As a result, a vortex shaped flow of air occurs in the cyclone body 100 and in the dust receptacle 200, generating a centrifugal force that separates the contaminants from the air.

The dust receptacle 200 is removably connected to the cyclone body 100, and it forms the vortex of air in cooperation with the cyclone body 100. The dust receptacle 200 also receives the contaminants separated from the air.

The grill assembly 300 is disposed at the air outflow port 112 of the cyclone body 100, for preventing traverse flow of the contaminants from the dust receptacle 200 to the air outflow port 112. This grill assembly 300 includes a grill body 310, a plurality of longitudinal slots 320 formed on the outer circumference of the grill body 310 to form a passage toward the air outflow port 112, and a contaminant reversal preventing plate 330 of frosto-conical shape which is formed at the lower end of the grill body 310. The grill body 310 hung from the cyclone body 100 at its upper rim, and so the grill assembly 300 is disposed at the air outflow port 112 of the cyclone body 100. A plurality of longitudinal slots 320 are formed along the longitudinal direction of the grill body 310 at a predetermined distance from one another. At least two opposing longitudinal slots 320 are formed such that these slots 320 also serve the function of guides for a dust removing member (described below) when the dust removing member is moved upward and downward.

Although this embodiment depicts four (4) slots 320 serving as the guide, the number of the slots 320 can be varied to, for example, two (2) through four (4).

The contaminant reversal preventing plate 330 blocks particulate contaminants in the upwardly moving air in the dust receptacle 200 from reaching the grill body 310. Blocked contaminants striking the plate 330 fall downwardly into the bottom of the dust receptacle 200.

The contaminant removing unit 400 removes the contaminants that adhere to and around the slots 320 of the grill assembly 300, and includes a contaminant removing member 410 and an operation lever 420.

The contaminant removing member 410 is movably disposed on the grill body 310 of the grill assembly 300 to be moved upward and downward along the outer circumference of the grill body 310. One end of the operation lever 420 is connected to a center of the contaminant removing member 410, while the other end protrudes outward through the inside of the grill body 310 and through the hole 113 that is formed in the upper body 110 of the cyclone body 100. The contaminant removing member 410 has a brush 412 attached to an inner circumference of the cylindrical body 411, and ribs 413 that are formed inside the contaminant removing member 410 and extend through the number of the longitudinal slots 320 of the grill body 310 that serve the guiding function. Accordingly, there could be four (4) ribs 413 as depicted in FIG. 2, or two (2) or three (3) ribs, preferably formed so as to be spaced apart in a uniform array. A handle 421 is formed on the other end of the operation lever 420, allowing a user to pull or push the operation lever 420 and to thus move the contaminant removing member 410 upward and downward over the outer circumference surface of the grill body 310. In the upward or downward movement of the contaminant removing member 410, the contaminants on the outer circumference of the grill body 310 are removed by the brush 412 as suggested in FIG. 3.

According to the preferred embodiment of the present invention, a guide 340 can be formed at an inner side of the grill body 310, to guide the movement of the operation lever 420. It is preferred that the through hole 113 of the cyclone body 100 be sealed by a seal 114.

As the vacuum cleaner is operated by the suction force generated at the suction port, the contaminant-laden air is drawn into the cyclone body 100 through the first connection pipe 121 and the air inflow port 122 in a helically downward or diagonal direction. The drawn air is turned into a vortex, while moving down to the dust receptacle 200. During this process, by the centrifugal force of the vortex air, the contaminants are separated from the air and are received in the dust receptacle 200.

Next, by the air current is reflected upward from the bottom of the dust receptacle 200, and the contaminant-laden air is discharged toward the cleaner body through the respective longitudinal slots 320 of the grill assembly 300, the air outflow port 112 and the second connection pipe 111. In this process, some contaminants, which are entrained in the upwardly moving air current in the dust receptacle 200, strike the contaminant reversal preventing plate 330 and are reflected into the vortex of air. Some large particles of the contaminants, which are still left after striking the contaminant reversal preventing plate 330, are filtered out at the longitudinal slots 320 and are reflected back to the vortex of air, and the air is discharged through the longitudinal slots 320 of the grill assembly 300.

In the process described above, as mentioned earlier, contaminants adhere to and around the respective longitudinal slots 320 of the grill assembly 300 and accumulate thereon. In such a situation, when the user grasps the handle 421 protruding outside of the cyclone body 100 and pulls and pushes the operation lever 420 several times, the contaminant removing member 410 is moved upwardly and downwardly along the outer circumference of the grill body 310, removing the accumulated contaminants around the longitudinal slots 320 of the grill assembly 300. The removed contaminants are collected in the dust receptacle 200.

With the cyclone dust collecting apparatus for a vacuum cleaner according to the present invention, the contaminants at the longitudinal slots 320 of the grill assembly 300 can be removed very easily without removing the dust receptacle 200 from its operating position.

According to the present invention as described above, since the user can remove the contaminants from the longitudinal slots 320 of the grill assembly 300 very easily without removing or disturbing the dust receptacle 200. The vacuum cleaner becomes not only easy to use, but also environment-friendly as there are no contaminants floating about during the removal of contaminants from the grill assembly 300.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A cyclone dust collecting apparatus for a vacuum cleaner, comprising:

a cyclone body comprising:

a first connection pipe connected to an extension pipe adjacent to a suction port of the vacuum cleaner;

a second connection pipe connected to the extension pipe adjacent to a body of the vacuum cleaner;

an air inflow port interconnected with the first connection pipe;

an air outflow port interconnected with the second connection pipe;

the cyclone body shaped and adapted to form a vortex of contaminant-laden air that is drawn in through the air inflow port;

a dust receptacle removably connected to the cyclone body for receiving contaminants separated from the air by the vortex;

a grill assembly disposed at the air outflow port of the cyclone body, and having a plurality of longitudinal slots formed in an outer circumference of the grill body at a constant interval from each other to form a passage for permitting air to flow toward the air outflow port, the grill assembly preventing a reverse flow of the contaminants collected in the dust receptacle through the air outflow port of the cyclone body;

a contaminant removing member movable along the outer circumference surface of the grill body to be moved upward and downward to remove contaminants adhering to and around the respective longitudinal slots of the grill assembly; and an operation lever having one end being connected to a center of the contaminant removing member and the other end protruding outside of the cyclone body through an inside of the grill body, the operation lever being adapted to move the contaminant removing member upward and downward.

2. The cyclone dust collecting apparatus of claim 1, wherein the plurality of longitudinal slots comprise at least two opposing slots serving the function of a guide for the contaminant removing member when the contaminant removing member is moved upward and downward, and wherein the contaminant removing member comprises a cylindrical body with a rib that is inserted into opposing slots, and a brush that engages an outer circumference surface of the cylindrical body.

3. The cyclone dust collecting apparatus of claim 1, wherein the grill assembly further comprises a conical contaminant reversal preventing plate, which is integrally formed with a lower end of the grill body.

4. The cyclone dust collecting apparatus of claim 1, wherein the other end of the operation lever is provided with a handle formed thereon.

* * * * *